United States Patent
Karino

(10) Patent No.: US 9,614,747 B2
(45) Date of Patent: Apr. 4, 2017

(54) NETWORK SYSTEM, CONTROLLER, AND FLOW CONTROL METHOD

(75) Inventor: Shuichi Karino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 691 days.

(21) Appl. No.: 13/984,008

(22) PCT Filed: Sep. 12, 2011

(86) PCT No.: PCT/JP2011/005127
§ 371 (c)(1),
(2), (4) Date: Aug. 6, 2013

(87) PCT Pub. No.: WO2012/114398
PCT Pub. Date: Aug. 30, 2012

(65) Prior Publication Data
US 2013/0318255 A1    Nov. 28, 2013

(30) Foreign Application Priority Data
Feb. 24, 2011    (JP) ................................ 2011-038120

(51) Int. Cl.
H04L 12/701    (2013.01)
H04L 12/44    (2006.01)

(52) U.S. Cl.
CPC .............. *H04L 45/00* (2013.01); *H04L 12/44* (2013.01)

(58) Field of Classification Search
CPC ................................ H04L 45/00; H04L 12/44
(Continued)

(56) References Cited

U.S. PATENT DOCUMENTS

2008/0155647 A1    6/2008    Miyawaki et al.
2009/0204723 A1*    8/2009    Tonsing .............. H04L 12/5602
709/238
(Continued)

FOREIGN PATENT DOCUMENTS

JP    2001-249866 A    9/2001
JP    2007-522583 A    8/2007
(Continued)

OTHER PUBLICATIONS

ONF, "OpenFlow Switch Specification version 1.1.0", The Open Networking Foundation, Feb. 2011.*
(Continued)

*Primary Examiner* — Nicholas Taylor
*Assistant Examiner* — Chong G Kim
(74) *Attorney, Agent, or Firm* — McGinn IP Law, Group, PLLC

(57) ABSTRACT

A network system is provided. The network system includes a server, a switch connected to a server, and a controller controlling the functions of the server and the switch. The server includes a processor and a network adapter connected to a processor. The network adapter processes packets of each flow in accordance with a filter table. The processor includes a virtual machine and a virtual switch which relays packets transmitted and received by the virtual machine to and from an external entity. The network adapter has an offloading function which exchanges packets with the virtual machine without using the virtual switch. In a tunneling process, the switch exchanges packets with the virtual machine through a tunneling-dedicated port, and the network adapter forwards the packets between the switch and the virtual machine without referring to the filter table. The controller dynamically controls enabling/disenabling of the tunneling process for each flow.

20 Claims, 17 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2010/0223397 | A1* | 9/2010 | Elzur | H04L 41/0213 709/235 |
| 2012/0005521 | A1* | 1/2012 | Droux | G06F 11/2005 714/4.11 |
| 2012/0209940 | A1* | 8/2012 | Kidambi | H04L 45/586 709/212 |
| 2013/0061047 | A1* | 3/2013 | Sridharan | H04L 45/586 713/162 |
| 2014/0215463 | A1* | 7/2014 | Hendel | G06F 9/45533 718/1 |

FOREIGN PATENT DOCUMENTS

| | | |
|---|---|---|
| JP | 2008-102929 A | 5/2008 |
| JP | 2008-160803 A | 7/2008 |
| JP | 2009-506618 A | 2/2009 |
| JP | 2009-151745 A | 7/2009 |

OTHER PUBLICATIONS

Nishihara, "New Cloud Networking Enabled by ProgrammableFlow", NEC technical journal, vol. 5 No. 2, 2010.*

International Search Report in PCT/JP2011/005127 dated Apr. 10, 2011 (English Translation Thereof).

Shuichi Karino, "A Proposal of Dynamic Offloading of vswitch Tasks", proceeding of general meeting of the Institute of Electronics, Information and Communication Engineers, p. B-6-45, 2010.

English translation of PCT/ISA/237 (written opinion of the international searching authority, dated Oct. 4, 2011).
PCT/IB/373 dated Aug. 27, 2013.

* cited by examiner

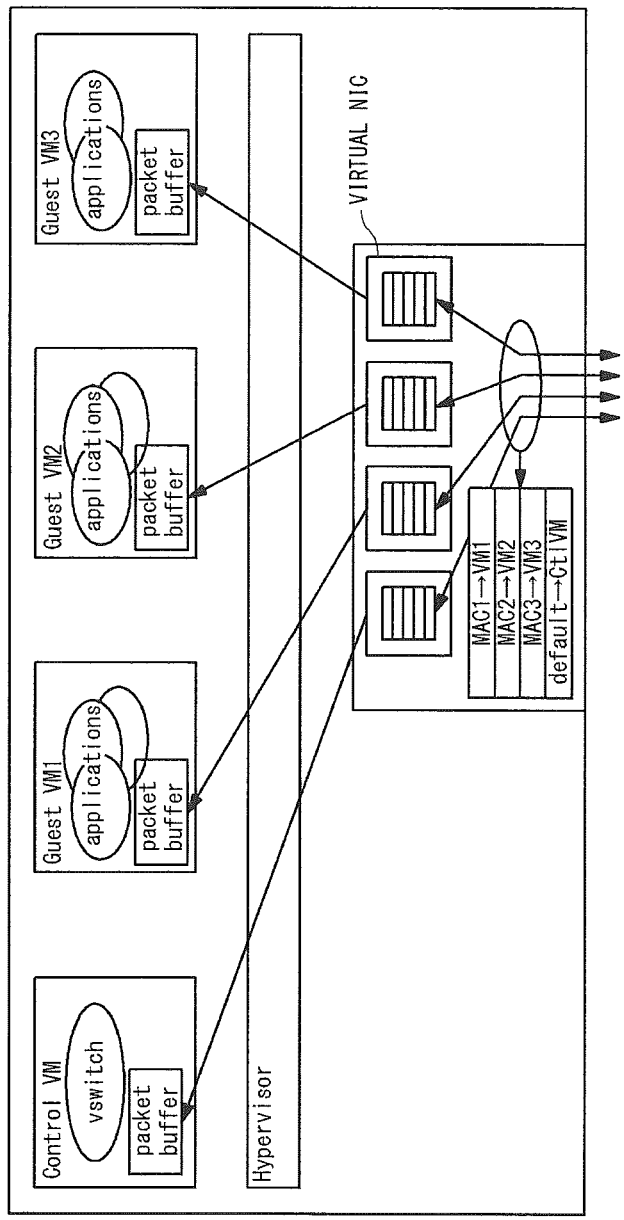

Fig. 7

FILT1:RECEPTION FILTER TABLE

| Key | Action |
|---|---|
| flow1 | VM1 |
| flow2 | VM2 |
| flow3 | |
| ⋮ | ⋮ |
| * | vswitch |

Fig. 10

FILT2:TRANSMISSION FILTER TABLE

| Key | Action |
|---|---|
| 192.168.0.1:1025→192.168.10.5:80 | out |
| 192.168.1.2:1025→192.168.11.3:22 | out |
| 192.168.1.2:1026→192.168.11.3:22 | out |
| ⋮ | ⋮ |
| * | loopback |

Fig. 12

| Key | Action |
|---|---|
| 192.168.0.1:1025→192.168.10.5:80 | out |
| 192.168.10.5:80→192.168.0.1:1025 | VM1 |
| 192.168.1.2:1025→192.168.11.3:22 | out |
| 192.168.11.3:22→192.168.1.2:1025 | VM2 |
| 192.168.1.2:1026→192.168.11.3:22 | out |
| 192.168.11.3:22→192.168.1.2:1026 | VM2 |
| ⋮ | ⋮ |
| * | vswitch |

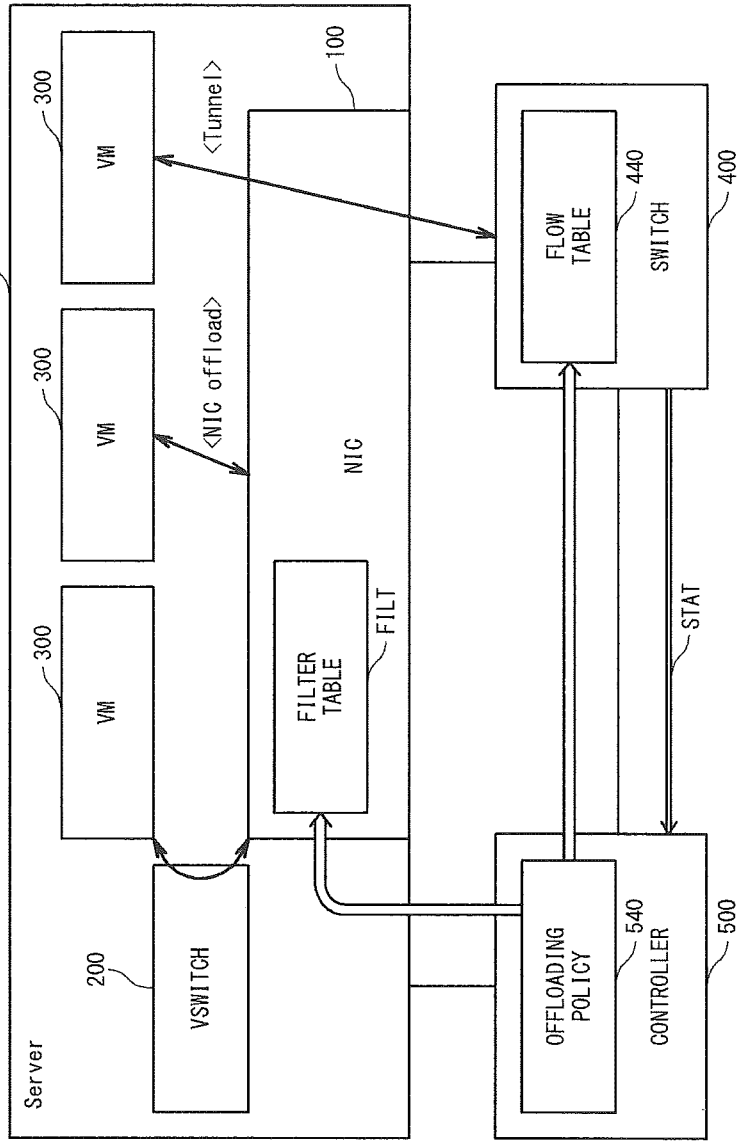

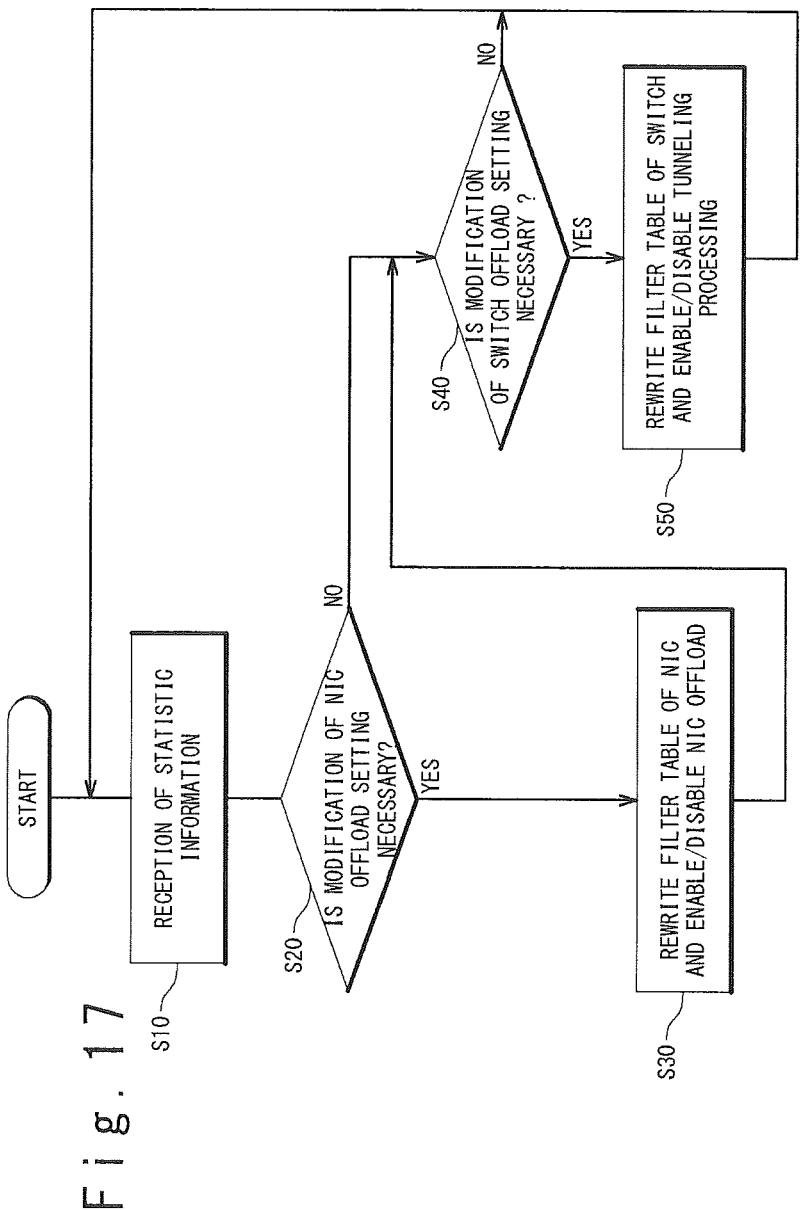

NETWORK SYSTEM, CONTROLLER, AND FLOW CONTROL METHOD

TECHNICAL FIELD

The present invention relates to a network system incorporating a server based on a virtualization technique and a flow control method in such network system.

BACKGROUND ART

The virtualization technique is of importance in the field of the server. More specifically, one physical machine can be operated as multiple virtual machines (VMs) through a virtualization technique which uses virtualization software such as VMware and Xen (which are both registered trademarks). This enables efficient server operations.

The virtualization technique also provides a virtual switch in a physical server, in addition to virtual machines. The virtual switch is a software-based packet switch and relays communications among virtual machines and between the virtual machines and external entities, as shown in FIGS. 1A and 1B. The traffic control of the virtual switch is easily achieved, since the virtual switch is provided adjacent to the virtual machines. In addition, the virtual switch is superior in the flexibility and extensibility since the virtual switch is based on software.

Also known in the art is the I/O (input/output) virtualization technique, such as VT-d/Vt-c (registered trademark). The I/O virtualization technique allows direct data exchanges between virtual machines and network interface cards (NIC) without using a virtual switch. More specifically, as shown in FIG. 2, a virtual NIC is provided for each virtual machine. The use of these virtual NIC enables completely bypassing the virtual switch. Such processing is referred to as "NIC-offloading", hereinafter.

The following are known as techniques related to virtualization:

An apparatus disclosed in Japanese translation of PCT application No. P2007-522583A (patent literature 1) includes at least one router and a data structure. The data structure is used by the router(s) for forming a virtual network by organizing connections among virtual network interface cards (VNIC).

Japanese Patent Application Publication No. P2008-102929A (patent literature 2) discloses a technique for achieving communications with a network adapter by using a queue data structure. A device driver recalls a device driver service for initially setting entries of an address-transformation-and-protection table (ATPT) in a route complex related to the queue data structure. The device driver service returns a non-transformed address and the non-transformed address is then supplied to a network adapter. In response to a queue element being retrieved from the queue data structure, the network adapter issues a request for transforming the non-transformed address specified by the queue element; this enables storing a transformed address in the network adapter before receiving a data packet which is destined for a buffer related to the queue element.

Japanese Patent Application No. P2009-151745A (patent literature 3) discloses a virtual machine monitor which operates virtual servers on a multi-processor system. The virtual machine monitor includes a physical hardware information acquisition section, a reception section and an assignment processing section. The physical hardware information acquisition section acquires hardware configuration information including physical location information of hardware of the multiprocessor system, including processors, memories, I/O devices and a network. The reception section receives a generation request which indicates the number of processors, the memory amount and the assignment policy of I/O devices and resources of virtual servers to be generated. The assignment processing section assigns the I/O devices to the virtual servers on the basis of the received generation request and then assigns the processors and the memories to the virtual servers so as to satisfy the assignment policy.

For the cases of FIGS. 1A and 1B, the virtual switch relays the entire traffic between the virtual machines and external entities. This implies that the traffic is concentrated on the virtual switch. In addition, the virtual switch, which operates based on software, may proceed with the switch processing with a single thread in some cases. In this case, the virtual switch may be unable to accommodate the concentrated traffic. Therefore, the virtual switch tends to become a bottleneck in network processing.

The use of the NIC-offloading shown in FIG. 2, on the other hand, enables completely bypassing the virtual switch. In this case, however, the packet communication route is fixed, resulting in that the advantage of the flexible traffic control based on the virtual switch is discarded.

Shuichi Karino, "A Proposal of Dynamic Offloading of vswitch Tasks", proceeding of general meeting of the Institute of Electronics, Information and Communication Engineers, page B-6-45, 2010 (non-patent document 1) discloses that the use and non-use of the NIC-offloading is dynamically controlled for each flow. This enables suppressing the concentration of the traffic on the virtual switch, while providing the advantage of the flexible traffic control based on the virtual switch.

CITATION LIST

Patent Literature

[PTL 1]
Japanese translation of PCT application No. P2007-522583A
[PTL 2]
Japanese Patent Application Publication No. P2008-102929A
[PTL 3]
Japanese Patent Application No. P2009-151745A Non Patent Literature

[NPL 1]
Shuichi Karino, "A Proposal of Dynamic Offloading of vswitch Tasks", proceeding of general meeting of the Institute of Electronics, Information and Communication Engineers, page B-6-45, 2010

SUMMARY OF INVENTION

The inventor focuses attention on the following issue: Some commercially-available NICs do not have a sufficient flow resolution. For example, some commercially-available NICs can use only five tuples for matching, although the OpenFlow requires 12 tuples. When the flow resolution of a NIC is insufficient as thus described, this makes it impossible to apply NIC-offloading to a desired flow. More generally, when a function of a network adapter of a server is insufficient, there is a possibility in which a desired NIC-offloading is not achieved. In this case, it is impossible to sufficiently suppress the concentration of the traffic on the virtual switch.

Therefore, one objective of the present invention is to provide a technique for compensating the function insufficiency of a network adapter of a server.

In one aspect of the present invention, a network system is provided. The network system includes a server, a switch connected to a server, and a controller controlling the functions of the server and the switch. The server includes a processor and a network adapter connected to a processor. The network adapter processes packets of each flow in accordance with a filter table. The processor includes a virtual machine and a virtual switch which relays packets transmitted and received by the virtual machine to and from an external entity. The network adapter has an offloading function which exchanges packets with the virtual machine without using the virtual switch. In a tunneling process, the switch exchanges packets with the virtual machine through a tunneling-dedicated port, and the network adapter forwards the packets between the switch and the virtual machine without referring to the filter table. The controller dynamically controls enabling/disenabling of the tunneling process for each flow.

In another aspect of the present invention, a controller is provided which controls the functions of a server and a switch connected to the server, in a network system. The server includes a processor and a network adapter connected to a processor. The network adapter processes packets of each flow in accordance with a filter table. The processor includes a virtual machine and a virtual switch which relays packets transmitted and received by the virtual machine to and from an external entity. The network adapter has an offloading function which exchanges packets with the virtual machine without using the virtual switch. In a tunneling process, the switch exchanges packets with the virtual machine through a tunneling-dedicated port, and the network adapter forwards the packets between the switch and the virtual machine without referring to the filter table. The controller includes a flow controller and a storage device storing an offloading policy table. The offloading policy table defines policies of enabling/disenabling of the offloading function by the network adapter and enabling/disenabling of the tunneling process. In accordance with the offloading policy table, the flow controller dynamically controls the enabling/disenabling of the offloading function by the network adapter for each flow and dynamically controls the enabling/disenabling of the tunneling process for each flow.

In still another aspect of the present invention, a flow control method in a network system is provided. The network system includes a server and a switch connected to the server. The server includes a processor and a network adapter connected to a processor. The network adapter processes packets of each flow in accordance with a filter table. The processor includes a virtual machine and a virtual switch which relays packets transmitted and received by the virtual machine to and from an external entity. The network adapter has an offloading function which exchanges packets with the virtual machine without using the virtual switch. In a tunneling process, the switch exchanges packets with the virtual machine through a tunneling-dedicated port, and the network adapter forwards the packets between the switch and the virtual machine without referring to the filter table. The flow control method includes steps of: dynamically controlling enabling/disenabling of the offloading function by the network adapter for each flow; and dynamically controlling enabling/disenabling of the tunneling process for each flow.

The present invention enables compensating the function insufficiency of a network adapter of a server. This enables achieving a desired offloading while sufficiently suppressing the concentration of the traffic on a virtual switch.

BRIEF DESCRIPTION OF DRAWINGS

FIG. 2 is a schematic diagram showing the NIC-offloading function;

FIG. 7 is a schematic diagram showing one example of a reception filter table in one embodiment of the present invention;

FIG. 10 is a schematic diagram showing one example of a transmission filter table in one embodiment of the present invention;

FIG. 12 is a schematic diagram showing a transmission/reception table in one embodiment of the present invention;

FIG. 16 is a schematic diagram showing dynamic controls of NIC-offloading and tunneling process; and FIG. 17 is a flowchart showing the process performed by a controller in one embodiment of the present invention.

DESCRIPTION OF EMBODIMENTS

In the following, preferred embodiments are described with reference to the attached drawings.

1. Server and NIC-offloading

First, a description is given of a server and NIC-offloading in one embodiment. The server and the NIC-offloading used in the present embodiment is also described in detail in Japanese Patent Application No. 2009-276679, which are directed to inventions which are also invented by the inventor of the present application. The disclosure of Japanese Patent Application No. 2009-276679 is incorporated herein by reference.

Figure 3:
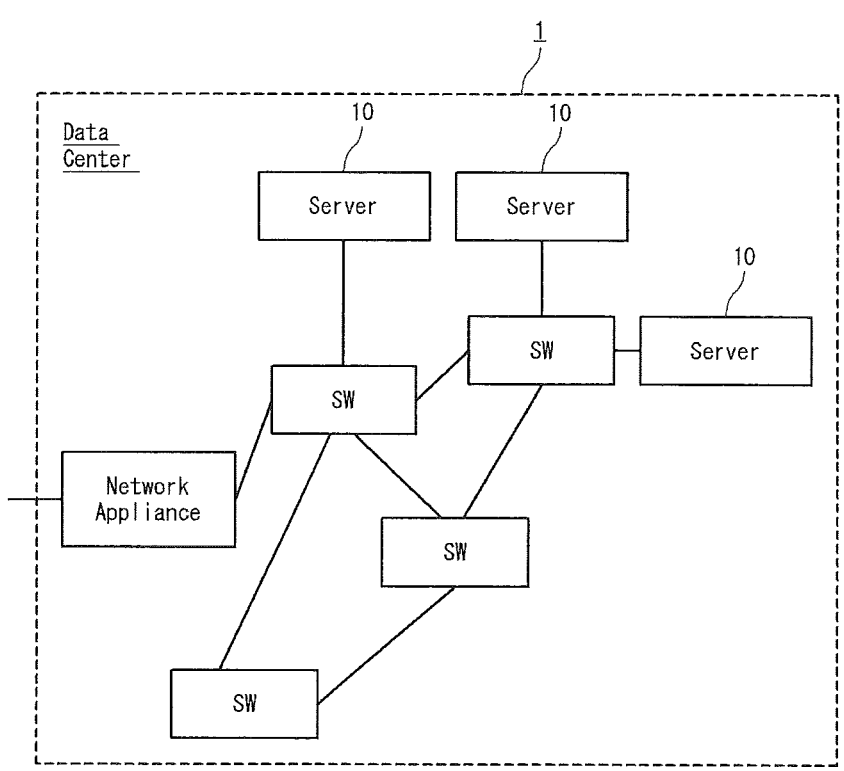
FIG. 3 is a block diagram schematically showing an exemplary configuration of a network system in one embodiment of the present invention.

FIG. 3 is a block diagram schematically showing an exemplary configuration of a network system 1 according to the present embodiment. The network system 1 includes a plurality of servers (physical servers) 10 connected to a network (not shown). Multiple switches are provided among the servers 10. The network system 1 is connected to an external network via a network appliance, such as a firewall and a load balancer. The network system 1 is used within a data center, for example.

Figure 4:
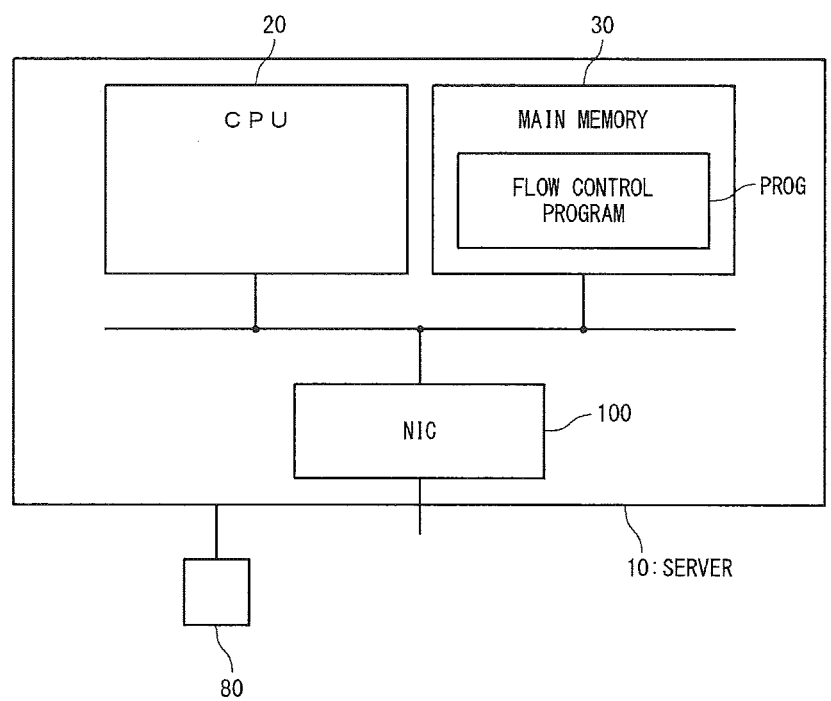
FIG. 4 is a block diagram showing an exemplary hardware configuration of a server in one embodiment of the present invention.

FIG. 4 is a block diagram showing an exemplary hardware configuration of each server 10 of the present embodiment. Each server 10 includes a CPU (central processing unit) 20, a main memory 30 and a network adapter (network interface device) 100. The network adapter 100 may be also referred to as network card or NIC (network interface card). The CPU 20, the main memory 30 and the network adapter 100 are mutually connected.

The main memory 30 stores virtualization software and a flow control program PROG. The virtualization software includes a computer program to be executed by the CPU 20, which builds virtual machines (VMs) and a virtual switch on each server 10. The flow control program PROG, which is executed by the CPU 20, provides a "route switching function" for each server 10 as described later. The virtualization software and the flow control program PROG may be recorded in a non-transitory computer-readable recording medium 80. The flow control program PROG may be incorporated within the virtualization software.

Figure 1A:
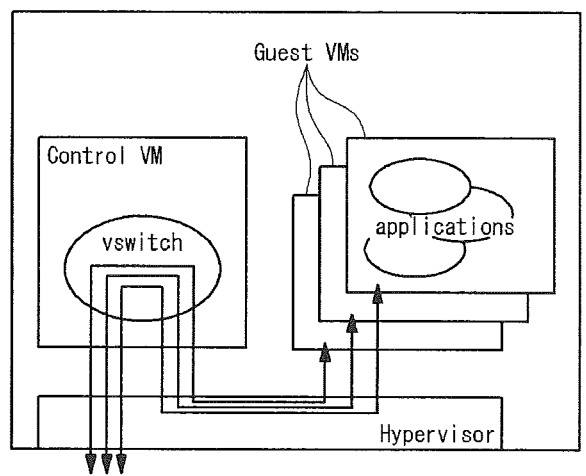
FIG. 1A is a schematic diagram showing one example of the virtual switch.
Figure 1B:
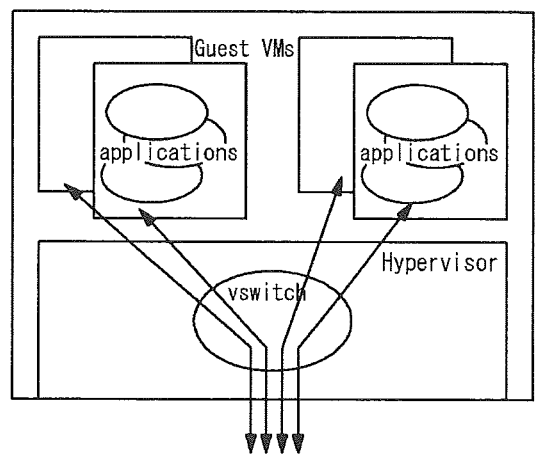
FIG. 1B is a schematic diagram showing another example of the virtual switch.
Figure 5:
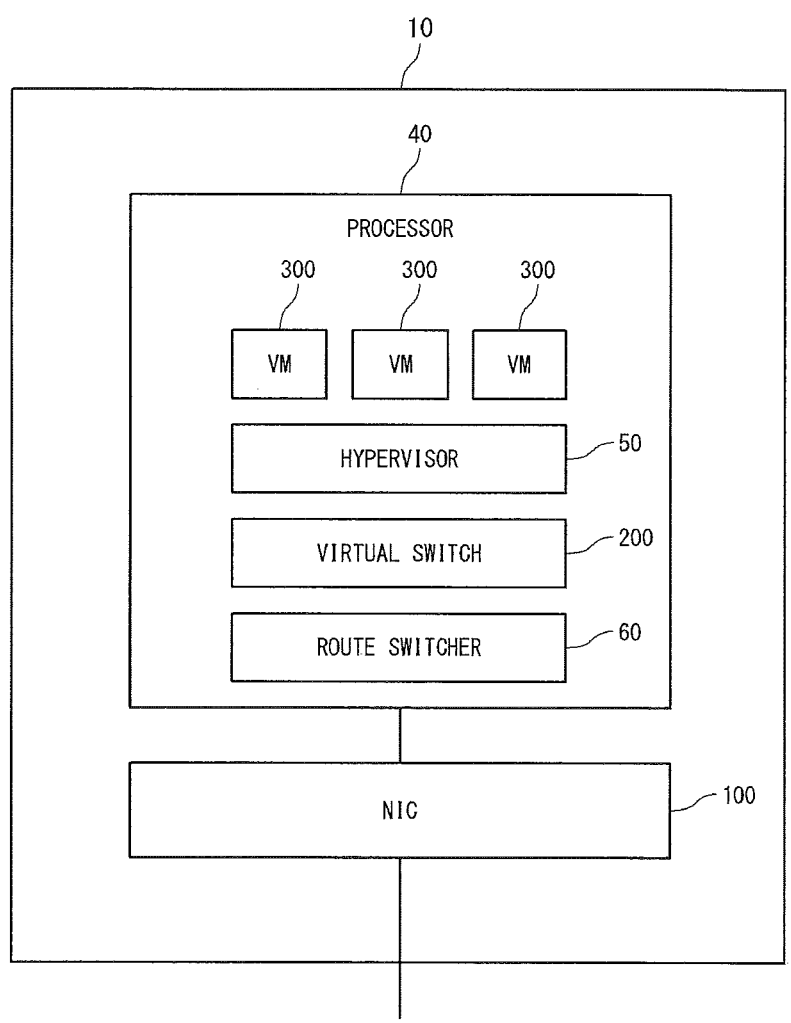
FIG. 5 is a block diagram schematically showing the configuration of the server in one embodiment of the present invention.

FIG. 5 is a block diagram schematically showing the configuration of each server 10 in the present invention. The server 10 includes a processing unit 40 and a network adapter 100 connected to the processing unit 40. The processor 40 is implemented as a cooperative combination of the afore-mentioned CPU 20, memory 30, virtualization software and flow control program PROG, and has various functions based on the virtual environment. More specifically, the processor 40 includes a hypervisor 50, a virtual switch 200 and at least one virtual machine (virtual server) 300. The hypervisor 50 manages the operation of each virtual machine 300 and provides communication paths among the virtual machines 300. The hypervisor 50 may be also referred to as virtual machine monitor (VMM). The virtual switch 200 relays packets transmitted and received by the virtual machines 300 to and from external entities. The virtual switch 200 may operate on a control virtual machine (control VM) (see FIG. 1A) or operate on the hypervisor 50 (see FIG. 1B). Applications are run on each virtual machine 300 (guest VM). The control VM may be also referred to as input/output virtual machine (IOVM).

In this embodiment, "NIC-offloading" is available by using the network adapter 100. In other words, data can be directly exchanged between the network adapter 100 and the virtual machines 300.

Figure 6:
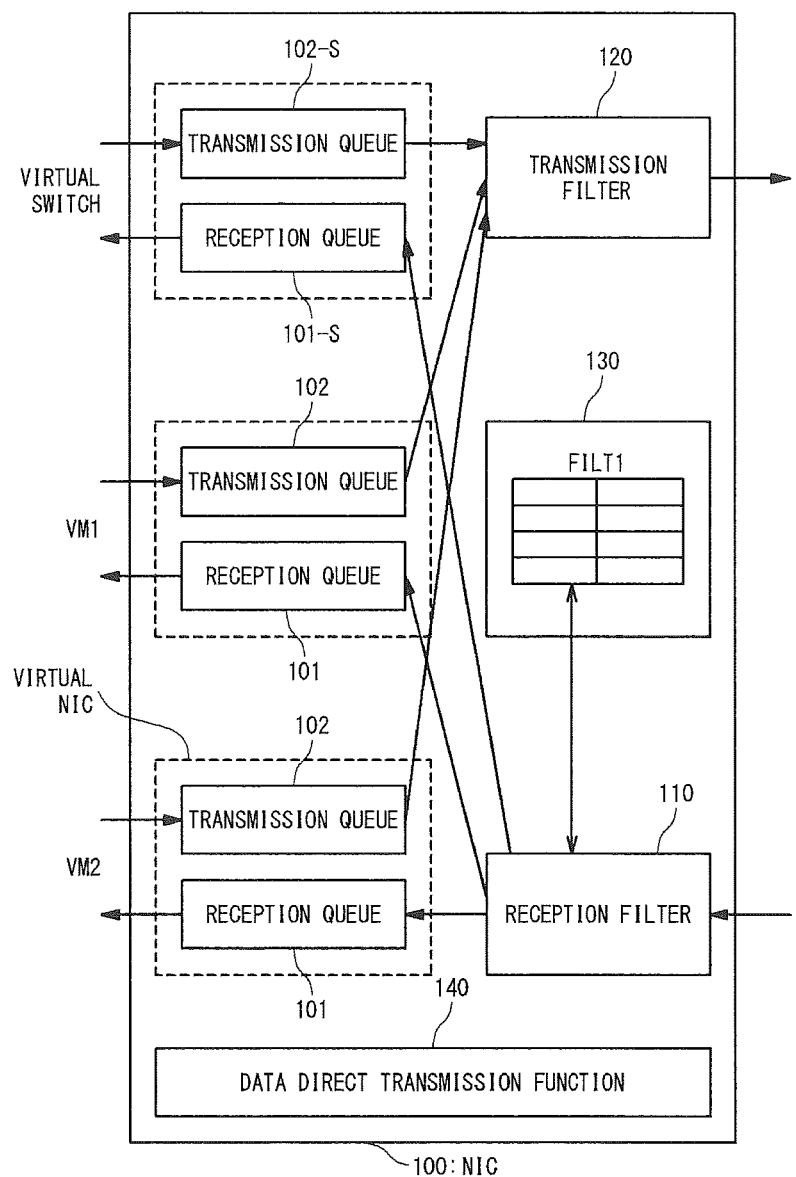
FIG. 6 is a block diagram showing the basic configuration of a network adapter in one embodiment of the present invention.

FIG. 6 is a block diagram showing the basic configuration of the network adapter 100 according to the present embodiment. The network adapter 100 includes virtual NICs (shown as dotted frames), a reception filter 110, a transmission filter 120, a storage device 130 and a data direct transmission function 140. The data direct transmission function 140 is a function for directly transmitting and receiving packets to and from the virtual machines 300 without using the virtual switch 200. In detail, the data direct transmission function 140 performs direct data transmission between the transmission and reception queues of the network adapter 100 and the address space used by the virtual machines 300.

Virtual NICs are respectively provided for virtual machines 300 (VM1, VM2, . . . ). Each virtual NIC includes a reception queue 101 and a transmission queue 102. The reception queue 101 stores therein reception packets received by the network adapter 100 from a data link. The reception packets stored in the reception queue 101 are directly transmitted to the corresponding virtual machine 300. The transmission packets which the network adapter 100 directly receives from the virtual machines by using the data direct transmission function 104 are stored in the transmission queues 102 corresponding to the virtual machines.

A virtual NIC is also provided for the virtual switch 200. The reception queue 101 and transmission queue 102 of the virtual NIC associated with the virtual switch 200 are referred to as reception queue 101-S and transmission queue 102-S, respectively, hereinafter. The reception queue 101-S stores therein reception packets received by the network adapter 100 from the external data link. The reception packets stored in the reception queue 101-S are forwarded to the virtual switch 200. Also, the transmission packets received by the network adapter 100 from the virtual switch 200 are stored in the transmission queue 102-S.

The transmission filter 120 selects the transmission queues 102 and 102-S in a predetermined order at predetermined timings. The transmission filter 120 then retrieves transmission packets from the selected transmission queue 102 or 102-S and forwards the transmission packets to the data link. It should be noted that the transmission queues 102 may store meta data of the packets, such as addresses at which the packets are stored within the virtual machines 300, in place of the packet data themselves. In this case, after selecting the transmission queue 102 from which packets are to be retrieved next, the transmission filter 120 instructs the data direct transmission function 140 to forward the relevant packets from the virtual machines 300 by using the meta data of the packets stored in the selected queue.

The reception filter 110 receives reception packets from the data link. The reception filter 110 selects which reception queue 101 or 101-S the reception packets are to be stored into. A "reception filter table FILT1" is used for this selection. The reception filter table FILT1 is stored in the storage device 130. Examples of the storage device 130 include a DRAM (dynamic random access memory), an SRAM (static random access memory) and a content addressable memory (CAM).

The reception filter table FILT1 indicates the association of the flows with the reception actions. The reception filter 110 refers to the reception filter table FILT1 and performs the reception action associated with the flow of the reception packets. There are two kinds of the reception actions. The first reception action involves "directly transmitting the reception packets to a specified virtual machine 300 by using the data direct transmission function 140". In this case, the reception filter 110 stores the reception packets 101 to the corresponding reception queue. The second reception action involves "transmitting the reception packets to the virtual switch 200". In this case, the reception filter 110 stores the reception packets into the reception queue 101-S, which is dedicated to the virtual switch 200.

FIG. 7 shows one example of the reception filter table FILT1. The reception filter table FILT1 includes a plurality of filter entries. Each filter entry indicates a key (Key) for identifying the flow and a reception action (Action) which is to be performed on reception packets of the associated flow. Each key is flow identification information which is formed as a combination of predetermined protocol header fields in the header information of reception packets. In one example, keys of the flow table of OpenFlowSwitch are used as the keys of the reception filter table FILT1 (see http://www.openflowswitch.org/). Each reception action indicates the reception queue into which the reception packets are to be stored. For example, "reception action: VM1" means the reception queue 101 associated with the virtual machine VM1, and indicates the aforementioned first reception action. Also, "reception action: vswitch" means the reception queue 101-S associated with the virtual switch 200, and indicates the aforementioned second reception action.

Upon reception of a reception packet, the reception filter 110 retrieves an exact match entry in the reception filter table FILT1 by using the header information of the reception packet. When there is an exact match entry which matches the flow of the reception packet, the reception filter 110 performs the first reception action on the reception packet, as indicated by the exact match entry. In the example of FIG. 7, for example, the reception filter 110 stores a reception packet belonging to the flow "flow1" in the reception queue 101 associated with the virtual machine VM1. When there is no exact match entry which matches the flow of the reception packet, on the other hand, the reception filter 110 performs the second reception action on the reception packet, that is, stores the reception packet into the reception queue 101-S associated with the virtual switch 200. Such operation allows performing the NIC-offloading.

Figure 8:
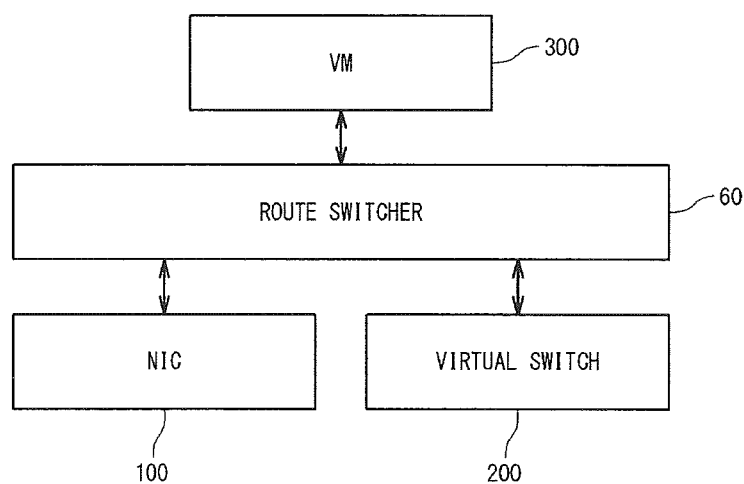
FIG. 8 is a schematic diagram showing the function of a route switcher in one embodiment of the present invention.

The server 10 of the present embodiment further includes a route switcher 60. FIG. 8 is a schematic diagram showing the function of the route switcher 60 in this embodiment. In this embodiment, the route switcher 60 dynamically switches the transmission routes of packets transmitted and received by the virtual machines 400.

In detail, there are two kinds of transmission routes of packets transmitted and received by the virtual machines 300. In the first route pattern, packets are directly exchanged between the network adapter 100 and the virtual machines 300 without using the virtual switch 200, by the aforementioned data direct transmission function 140 of the network adapter 100. In the second route pattern, on the other hand, packets are transmitted and received by the virtual machines 300 at least via the virtual switch 200. Hereinafter, the flows of the first and second route patterns are referred to as "first pattern flow" and "second pattern flow", respectively.

The route switcher 60 switches the route of each flow of packets transmitted and received by the virtual machines 300 between the first route pattern and the second route pattern. Furthermore, the route switcher 60 dynamically switches the route setting under predetermined conditions. In other words, the route switcher 60 dynamically switches each flow of packets transmitted and received by the virtual machines 300 between the first route pattern flow and the second route pattern flow. And, the route switcher 60 causes the data direct transmission function 140 of the network adapter 100 to handle the first route pattern flows and causes the virtual switch 200 to handle the second route pattern flows.

As thus described, all of the flows do not fixedly bypass the virtual switch 200 in this embodiment; only desired flows (the first route pattern flows) are subjected to NIC-offloading to bypass the virtual switch 200. Other flows (the second route pattern flows) are transmitted via the virtual switch 200, as in the normal operation. This allows suppressing the concentration of the traffic on the virtual switch 200, while providing the advantage of flexible traffic control based on the virtual switch 200.

It should be noted that the route switcher 60 may be achieved by executing the flow control program PROG by the server 10 (or the CPU 20). The route switcher 60 may be incorporated in the processor 40 as shown in FIG. 5. Instead, the route switcher 60 may be incorporated in the network adapter 100. Specifically, the route switcher 60 may be incorporated in the virtual switch 200 or the hypervisor 50 of the processor 40; however, the embodiment of the route switcher 60 is not limited to this.

In the following, the route switching process of the present embodiment is further described in detail.

Figure 9:
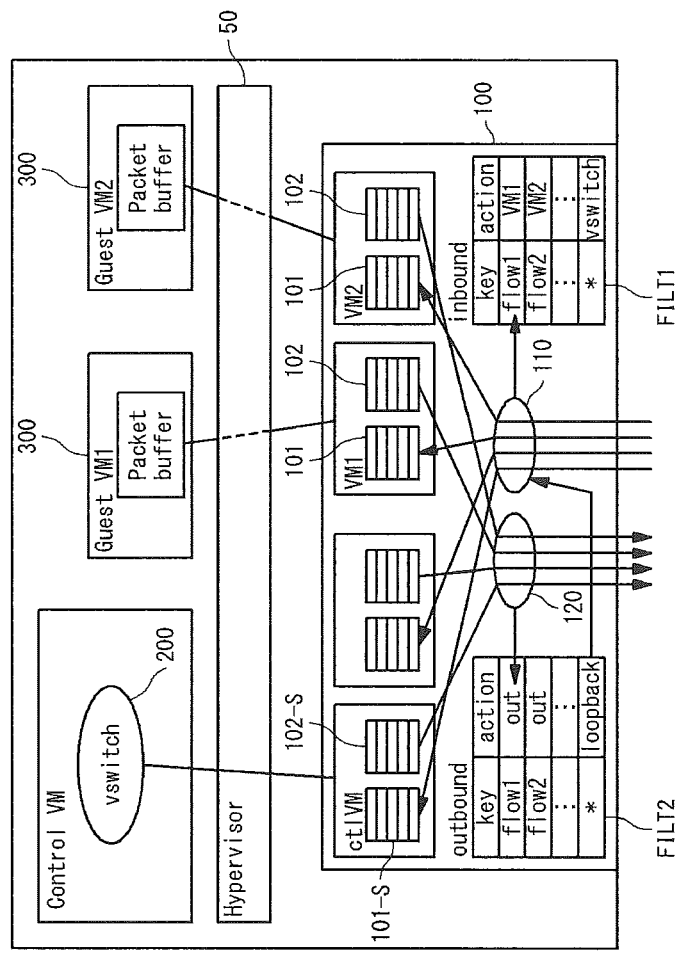
FIG. 9 is a schematic diagram showing one example of the route switching process in one embodiment of the present invention.

FIG. 9 is a schematic diagram showing one example of the route switching process of the present embodiment. In this example, a transmission filter table FILT2 is provided in the network adapter 100, in addition to the reception filter table FILT1. The transmission filter table FILT2 is stored in the storage device 130, as is the case of the reception filter table FILT1. It should be noted that the reception filter table FILG1 and the transmission filter table FILT2 may be collectively referred to as "filter tables FILT".

The transmission filter table FILT2 indicates the association of the flows with the transmission actions. The transmission filter 120 refers to the transmission filter table FILT2 and performs the transmission action associated with each flow of transmission packets. There are two kinds of transmission actions. The first transmission action involves "transmitting transmission packets to the external data link". In this case, the transmission filter 120 forwards the transmission packets to the data link. The second transmission action involves "looping back the transmission packets as reception packets to the reception filter 110 (on the reception route)". In this case, the transmission filter 120 loops back the transmission packets as reception packets to the reception filter 110.

FIG. 10 shows one example of the transmission filter table FILT2. The transmission filter table FILT2 includes a plurality of filter entries. Each filter entry indicates a key (Key) for identifying a flow and a transmission action (Action) to be performed on transmission packets of the relevant flow. Each key is flow identification information which is formed as a combination of predetermined protocol header fields of the header information of transmission packets. For example, keys of the flow table of OpenFlowSwitch (see http://www.openflowswitch.org/) may be used as the keys of the transmission filter table FILT2. Each transmission action indicates the first transmission action "out" or the second transmission action "loopback".

After acquiring a transmission packet from the selected transmission queue 102, the transmission filter 120 retrieves an exact match entry in the transmission filter table FILT2 by using the header information of the transmission packet. When there is an exact match entry which matches the flow of the transmission packet, the transmission filter 120 performs the first transmission action (out) on the transmission packet, as indicated by the exact match entry, that is, forwards the transmission packet to the data link. When there is no exact match entry which matches the flow of the transmission packet, on the other hand, the transmission filter 120 performs the second transmission action (loopback) on the transmission packet, that is, loops back the transmission packet as a reception packet to the reception filter 110 (on the reception route).

Figure 11:
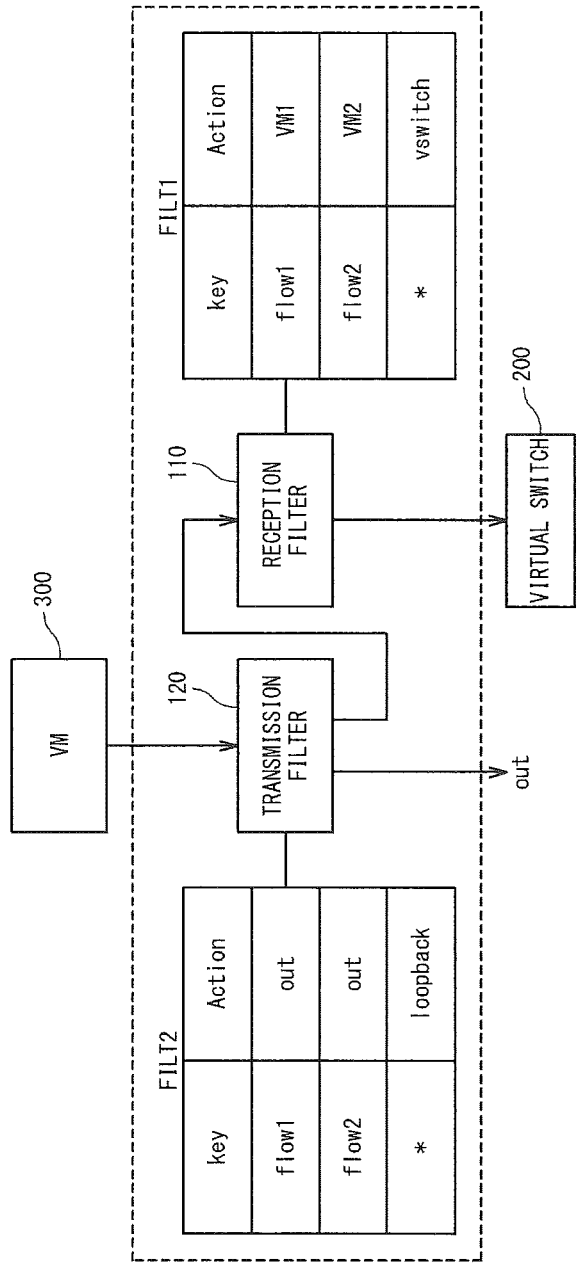
FIG. 11 is a schematic diagram showing two kinds of route patterns in one embodiment of the present invention.

In the following, a description is given of the two route patterns with reference to FIGS. 9 and 11. In the example of FIGS. 9 and 11, only the flows "flow1" and "flow2" are associated with the first reception action in the reception filter table FILT1, and the other flows are associated with the second reception action. Also, only the flows "flow1" and "flow2" are associated with the first transmission action in the transmission filter table FILT2, and the other flows are associated with the second transmission action.

In this example, a transmission packet transmitted from a virtual machine 300 is first inputted to the network adapter 100. In this case, the transmission packet is directly inputted to the network adapter 100 without using the virtual switch 200 by the data direct transmission function 140 of the network adapter 100. The transmission filter 120 retrieves the transmission packet from the selected transmission queue 102.

When the transmission packet belongs to the flow "flow1" or "flow2", an exact match entry is hit in the transmission filter table FILT2. Accordingly, the transmission filter 120 forwards the transmission packet to the data link. That is, this transmission packet is transmitted to an external entity from the virtual machine 300 via the network adapter 100 without passing the virtual switch 200. This procedure corresponds to the aforementioned first route pattern.

When the transmission packet belongs to a different flow, there is no exact match entry which is hit in the transmission filter table FILT2. Accordingly, the transmission filter 120 loops back the transmission packet as a reception packet to the reception filter 110. There is no exact match entry which is hit in the reception filter table FILT1, neither. Accordingly, the reception filter 110 transmits the reception packet to the virtual switch 200 via the reception queue 101-S. As a result, the packet is once inputted to the network adapter 100 and then processed by the virtual switch 200. Such operation corresponds to the aforementioned second route pattern.

A reception packets received from the data link is handled as follows: When the reception packet belongs to the flow "flow1" or "flow2", an exact match entry is hit in the reception filter table FILT1. Accordingly, the reception filter 110 stores the reception packet into the reception queue 101 associated with the corresponding virtual machine 300. The reception packet is directly transmitted to the corresponding virtual machine 300 by the data direct transmission function 140 without using the virtual switch 200. Such operation corresponds to the first route pattern.

When the reception packet belongs to a different flow, there is no exact match entry which is hit in the reception filter table FILT1. Accordingly, the reception filter 110 stores the reception packet into the reception queue 101-S associated with the virtual switch 200. This results in that the reception packet is processed by the virtual switch 200. Such operation corresponds to the second route pattern.

It should be noted that, as shown in FIG. 12, the reception filter table FILT1 and the transmission filter table FILT2 may be combined and prepared as a single transmission/reception filter table. In the example of FIG. 12, the second reception action and the second transmission action both involve "vswitch: storing the packet in the reception queue 101-S associated with the virtual switch 200". Such operation also achieves looping-back of the transmission packet to the reception route.

As thus described, the flow routes of packets transmitted and received by the virtual machines 300 can be switched between the first route pattern and the second route pattern by the entry settings of the reception filter table FILT1 and the transmission filter table FILT2. The flow route can be "dynamically" switched by modifying the entry settings of the reception filter table FILT1 and the transmission filter table FILT2. The route switcher 60 performs such entry settings and setting modifications.

More specifically, the route switcher 60 assigns each flow of packets transmitted and received by the virtual machines 300 to the first or second route pattern flow on the basis of predetermined standards. This assignment is allowed to be dynamically modified. The route switcher 60 sets the reception filter table FILT1 so as to correlate the first route pattern flows with the aforementioned first reception action and to correlate the second route patter flows with the second reception action. In addition, the route switcher 60 sets the transmission filter table FILT2 so as to correlate the first route pattern flows with the aforementioned first transmission action and to correlate the second route patter flows with the second transmission action. As a result, the first route pattern flows are processed without using the virtual switch 200, that is, NIC-offloading is achieved. The second route pattern flows, on the other hand, are processed by the virtual switch 200.

It should be noted that a filter entry related to the same flows may be set to only one of the reception filter table FILT1 and the transmission filter table FILT2. In this case, the route pattern is asymmetric between the receiving side and the transmitting side. Let us consider a case in which a filter entry related to the flow "flow1" is only set to the transmission filter table FILT2, in the above-mentioned FIGS. 9 and 11. In this case, the transmission route of a transmission packet of the flow "flow1" is set to the first route pattern, which does not pass the virtual switch 200, and the transmission route of a reception packet of the same is set to the second route pattern, which passes the virtual switch 200.

Figure 13:
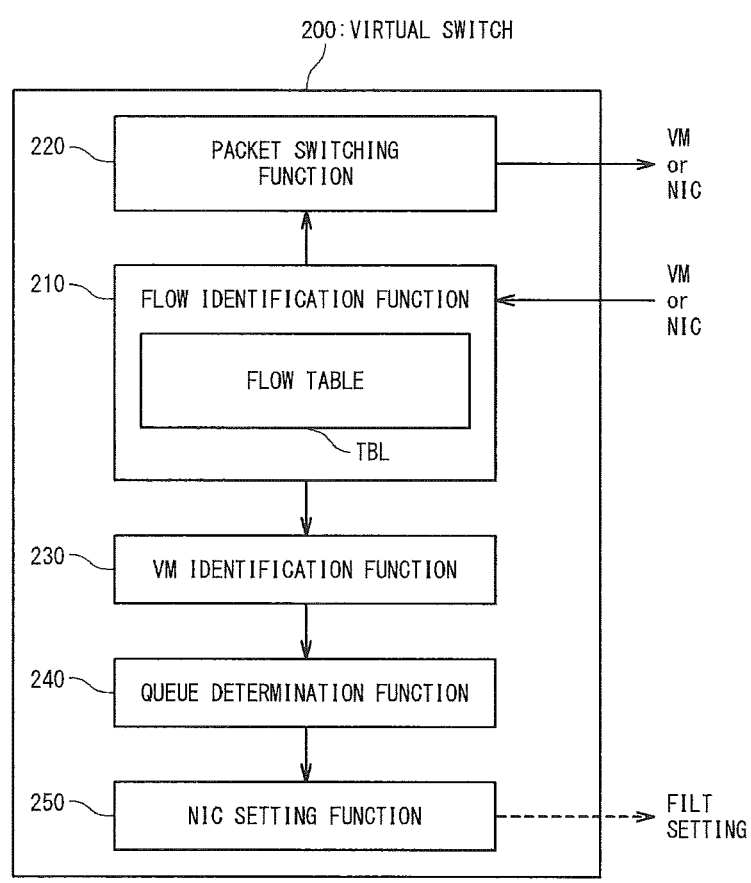
FIG. 13 is a block diagram showing an exemplary configuration of a virtual switch in one embodiment of the present invention.

The route switcher 60 may be incorporated in the virtual switch 200, for example. FIG. 13 is a block diagram showing an example of the function configuration of the virtual switch 200 in this case. The virtual switch 200 includes a flow identification function 210, a packet switching function 220, a VM identification function 230, a queue determination function 240 and an NIC setting function 250.

The virtual switch 200 receives packets from the network adapter 100 or the virtual machines 300. The flow identification function 210 identifies the flows of the respective packets on the basis of the header information of the received packets. The flow identification function 210 also selects the action to be performed on each packet, by referring to a flow table TBL which indicates the association of the flow identification information (Key) with the action (Action). The packet switching function 220 processes each packet in accordance with the selected action. Specifically, each action of the flow table TBL describes the output port (transmission destination) of the relevant packets. The packet switch function 220 outputs the packets from the output port specified by the action. The outputted packets are transmitted to the network adapter 100 or the virtual machines 300.

When there is no flow entry which matches the packet in the flow table TEL, The flow identification function 210 performs the packet on a predetermined process. For example, the flow identification function 210 forwards the packet to an OpenFlow controller (OFC) to request route setting.

The VM identification function 230 specifies a virtual machine 300 which transmits or receives packets belonging to a specified flow. Here, the "specified flow" is a flow for which an entry setting of the filter tables FILT is desired in the network adapter 100. The queue determination function 240 determines the transmission/reception queue (101 or 102) associated with the virtual machine 300 specified by the VM identification function 230. The NIC setting function 250 creates filter entries to be set into the filter tables FILT by appropriately referring to the transmission/reception queue. The NIC setting function 250 then transmits the created filter entries to the network adapter 100 to set or modify the filter tables FILT.

The route switcher 60 incorporates the VM identification function 230, the queue determination function 240 and the NIC setting function 250.

2. Switch Offloading

When a commercially-available network adapter 100 is used, there is a case that the flow resolution of the filter tables FILT is insufficient for desired processing. For example, a commercially-available NIC may only afford 5 tuples although OpenFlow requires 12 tuples. When the flow resolution of the network adapter 100 is insufficient, this may make the NIC-offloading inapplicable to a desired flow.

When the storage region assigned to the filter tables FILT is small, an overflow of the filter tables FILT easily occurs, and the overflow of the filter tables FILT makes it impossible to add a new filter entry to the filter tables FILT. This also constitutes a limiting factor for desired NIC-offloading.

As thus discussed, desired NIC-offloading may not be achieved when the function of the filter tables FILT of the network adapter 100 is insufficient. In such case, the concentration of the traffic on the virtual switch 200 is not sufficiently suppressed.

In this embodiment, an offloading based on a physical switch connected to the network adapter 100 is also implemented in order to compensate the function insufficiency of the filter tables FILT of the network adapter 100. Such offloading based on a physical switch is referred to as "switch offloading", hereinafter. In summary, not only "NIC-offloading" but also "switch offloading" are dynamically controlled in this embodiment. This effectively compensates the function insufficiency of the filter tables FILT of the network adapter 100. In the following, a description is given of the configuration and processing related to the switch offloading.

2-1. Overall Configuration

Figure 14:
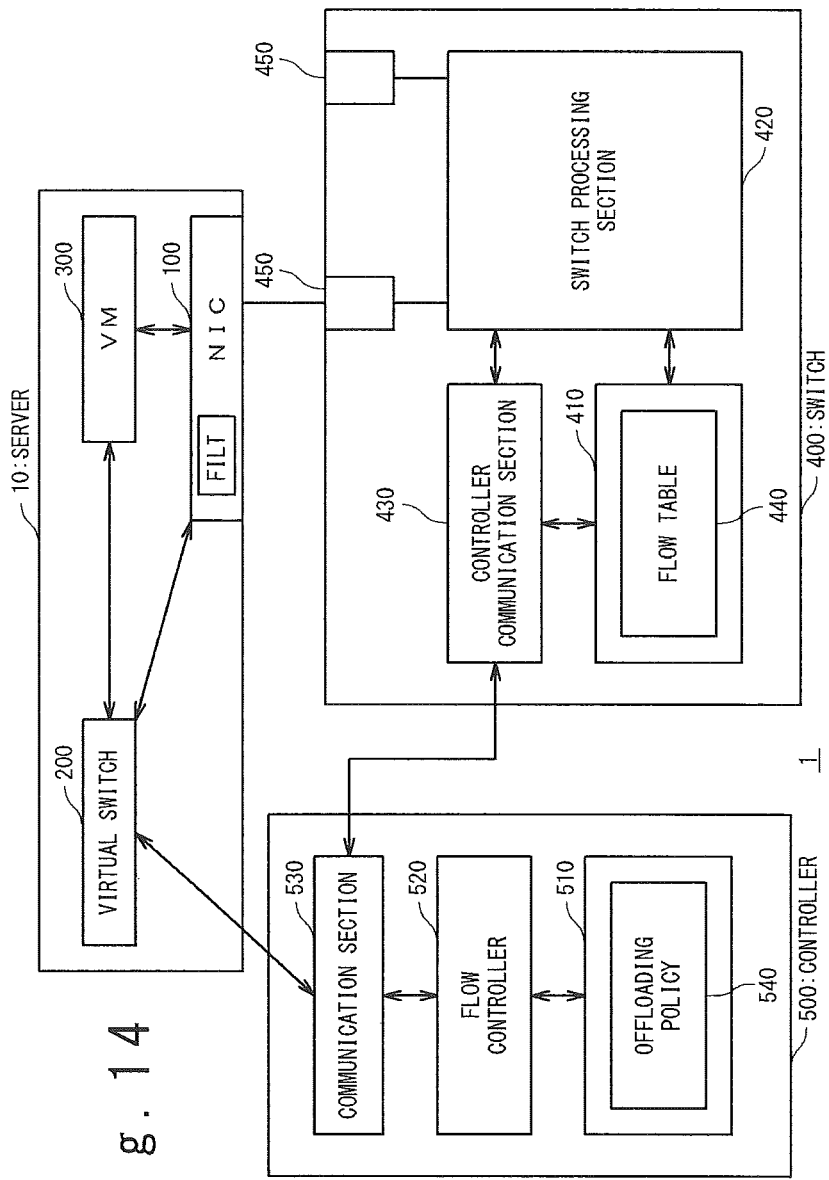
FIG. 14 is a block diagram schematically showing the configuration of the network system in one embodiment of the present invention.

FIG. 14 is a block diagram schematically showing the configuration of the network system 10 of the present embodiment. The network system 1 includes servers 10 (one shown), switches 400 (one shown) and a controller 500. The switches 400 are ToR (Top of Rack) switches connected to the servers 10. The controller 500 is connected to the servers 10 and the switches 400 and controls the functions of the servers 10 and the switches 400. In an OpenFlow network system, for example, the switches 400 are physical Open-Flow switches (POFSs) and the controller 500 is an Open-Flow controller (OFC).

2-2. Servers 10

The servers 10 each include a network adapter 100, a virtual switch 200 and virtual machines 300 (one shown). As described above, the network adapter 100 is configured to handle packets in units of flows in accordance with the filter tables FILT.

Furthermore, the network adapter 100 has the "NIC-offloading function" for transmitting and receiving packets to and from the virtual machines 300 without using the virtual switch 200, as described above. The enabling/disenabling of the NIC-offloading function for a desired flow can be achieved by appropriately setting the filter entry associated with the desired flow in the filter tables FILT. In other words, the enabling/disenabling of the NIC-offloading function can be dynamically controlled for each flow by the settings of the filter tables FILT. As described above, the settings of the filter tables FILT are achieved by the route switcher 60. In the above-described example, the virtual switch 200 functions as the route switch 200, and the filter tables FILT are configured or modified through the virtual switch 200.

2-3. Switches 400

The switches 400 each includes a flow table 440. The flow table 440 has a flow entry for each flow. Each flow entry indicates flow identification information (Key) and an action (Action) to be performed on packets of the relevant flow. The packet processing (such as, output to a specified port) specified by the corresponding action (Action) is performed on packets which matches the flow identification information (Key). The switches 400 perform packet processing for each flow in accordance with the flow table 400 thus configured.

In detail, the switches 400 each include a table management section 410, a switch processing section 420, a controller communication section 430 and a plurality of ports 450. The table management section 410 manages the flow table 440 (such as, modification of the settings). The table management section 410 includes a storage device and the flow table 440 is stored in this storage device. The switch processing section 420 receives packets via one of the ports 450 (input port). Also, the switch processing section 420 refers to the flow table 440 and performs packet processing on the received packets. Furthermore, the switch processing section 420 transmits packets via another of the ports 450 (output port). The controller 430 has the function of communicating with the controller 500. In an OpenFlow network system, the SecureChannel corresponds to the controller communication section 430.

2-4. Tunneling process

The network adapter 100, the virtual machines 300 and the switches 400 of the present embodiment support "tunneling process". In the tunneling process, the network adapter 100 transfers packets between the virtual machines 300 and the switches 400 without identifying the flow of each packet. In other words, the network adapter 100 transfers packets between the virtual machines 300 and the switches 400 without referring to the filter tables FILT.

Figure 15:
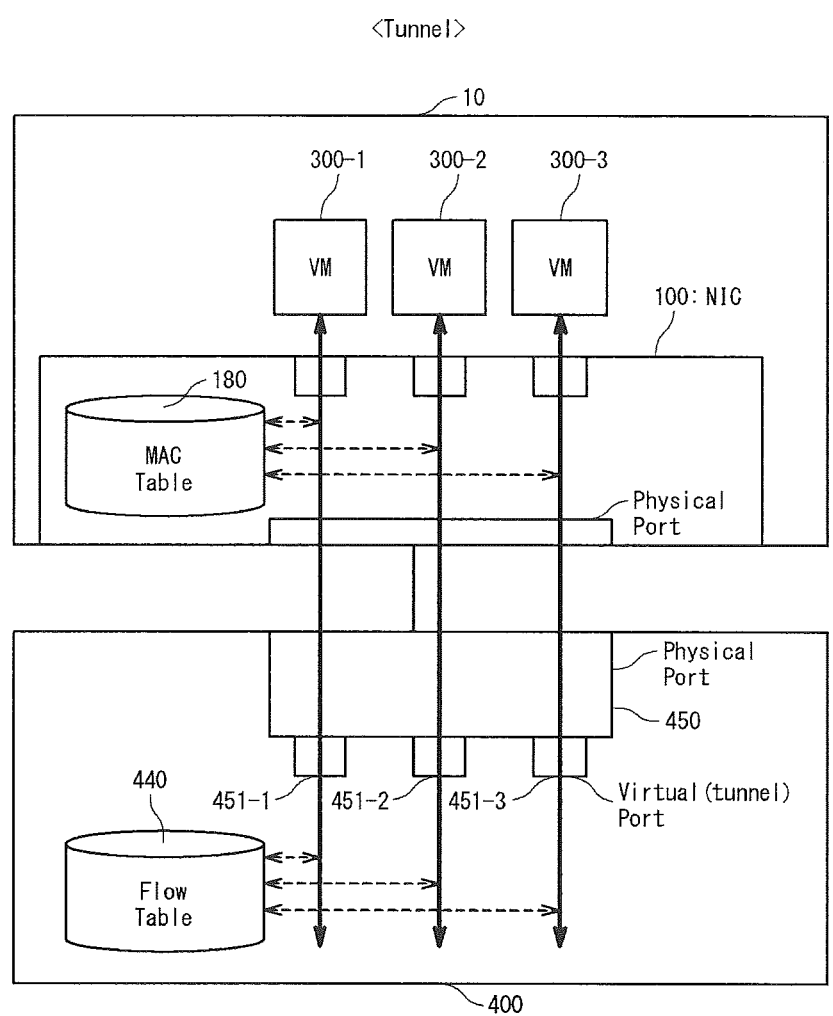
FIG. 15 is a schematic diagram showing a tunneling process in one embodiment of the present invention.

The tunneling process is further described in detail with reference to FIG. 15. As shown in FIG. 15, virtual ports 451 which are dedicated to the tunneling process (hereinafter, referred to as tunneling-dedicated ports 451) are provided for a certain physical port 450 of each switch 400. The tunneling-dedicated ports 451 are respectively prepared for the virtual machines 300. In FIG. 15, for example, the tunneling-dedicated ports 451-1 to 451-3 are associated with the virtual machines 300-1 to 300-3, respectively. In the tunneling process, the switch 400 transmits and receives packets to and from the virtual machines 300 via the associated tunneling dedicated ports 451. Here, the network adapter 100 transfers the packets between the switch 400 and the virtual machines 300 without referring to the filter tables FILT. More specifically, the network adapter 100 retrieves the MAC address of the MAC headers of the packets and determines the transmission destinations of the packets by referring the MAC table 180.

As thus described, the network adapter 100 performs packet transfer based on the MAC addresses of packets in the tunneling process without identifying the flows thereof. In other words, the tunneling process achieves packet transfer between the virtual machines 300 and the switch 400 without referring to the filter tables FILT. Such processing is equivalent to "switch offloading".

The flows on which the tunneling process (or switch offloading) is to be performed can be selected by appropriately setting the flow table 440 of the switch 400. More specifically, when the tunneling process is desired to be applied to a desired flow, this is achieved by setting the relevant flow entry of the flow table 440 so that packets of the desired flow are inputted and outputted via any of the tunneling-dedicated ports 451. On the contrary, when the tunneling process is not desired to be applied to a desired flow, this is achieved by setting the relevant flow entry of the flow table 440 so that packets of the desired flow are not inputted and outputted via any of the tunneling-dedicated ports 451. In this way, the enabling/disenabling of the tunneling process (switch offloading) can be controlled for each flow through setting the flow table 440 of the switch 400.

As thus described, the filter tables FILT of the network adapter 100 are not referred to in performing the tunneling process (switch offloading); instead, the flow table 440 of the switch 400 is used for the flow control. Accordingly, if the function of the filter tables FILT of the network adapter 100 is insufficient, this can be compensated by appropriately using the flow table 440 of the switch 400.

When the flow resolution of the filter tables FILT of the network adapter 100 is insufficient, for example, the use of the flow table 440 of the switch 400 which has a higher flow resolution allows performing the offloading processing on desired flows (the switch offloading instead of the NIC-offloading). This implies that the function insufficiency of filter tables FILT of the network adapter 100 is compensated by the flow table 440 of the switch 400.

Also, the use of the switch offloading effectively reduces the consumption of the entries of the filter tables FILT of the network adapter 100. This suppresses occurrence of an overflow of the filter tables FILT of the network adapter 100. Such approach is especially effective in a case that only a small storage region is allocated to the filter tables FILT. This also implies that the function insufficiency of filter tables FILT of the network adapter 100 is compensated by the flow table 440 of the switch 400.

2-5. Controller

In the present embodiment, the enabling/disenabling of the NIC-offloading by the network adapter 100 is dynamically controlled for each flow. In addition, the enabling/disenabling of the tunneling process (the switch offloading) is also dynamically controlled for each flow. These dynamic controls are both done by the controller 500.

As shown in FIG. 14, the controller 500 includes a storage device 510, a flow controller 520 and a communication section 530. The communication section 530 achieves data communication with the servers 10 and the switches 400. In an OpenFLow network system, the SecureChannel corresponds to the communication section 530.

The storage device 510 stores therein an offloading policy table 540. The offloading policy table 540 defines policies (or standards) related to the enabling/disenabling of the NIC-offloading and the enabling/disenabling of the tunneling process. The contents of the offloading policy table 540 are rewritable by the user. In accordance with the policies defined in the offloading policy table 540, the flow controller 520 dynamically controls the enabling/disenabling of the NIC-offloading and the enabling/disenabling of the tunneling process.

FIG. 16 is a schematic diagram showing the dynamic controls of the NIC-offloading and the tunneling process in the present embodiment.

The enabling/disenabling of the NIC-offloading with respect to a certain flow can be achieved by appropriately setting the filter entry associated with the flow in the filter tables FILT of the network adapter 100. Accordingly, the controller 500 dynamically controls the enabling/disenabling of the NIC-offloading for each flow through the settings of the filter tables FILT of the network adapter 100. In detail, the controller 500 issues a filter table setting instruction to the route switcher 60 of the virtual switch 200 to modify the settings of the filter tables FILT of the network adapter 100. This allows dynamically enabling/disenabling the application of the NIC-offloading to a desired flow.

Also, the enabling/disenabling of the tunneling process (switch offloading) for a certain flow can be achieved by appropriately setting the flow entry associated with the flow in the flow table 400 of the switch 400. Accordingly, the controller 500 dynamically controls the enabling/disenabling of the tunneling process through the settings of the flow table 440 of the switch 400. In detail, the controller 500 sets the flow table 400 so that packets of a desired flow are inputted to and outputted from any of the tunneling-dedicated ports 251. This allows dynamically enabling/disenabling the application of the tunneling process (switch offloading) to a desired flow.

It should be noted that the controller 500 performs the dynamic controls referring to the communication status (e.g. the throughput) of each flow. As shown in FIG. 16, for example, the switch 400 transmits statistical information STAT indicating the communication status of each flow to the controller 500 at predetermined intervals. The controller 500 refers to the statistical information STAT received from the switch 400 and applies NIC-offloading or switch-offloading to desired flows depending on the necessity. When the offloading policy table 540 determines that "the switch offloading is applied to a flow which has a throughput higher than a predetermined threshold", the controller 500 refers to the statistical information STAT and applies the switch offloading to necessary flows.

FIG. 17 is a flowchart showing the processing done by the controller 500 in the present embodiment. The controller 500 receives the statistical information STAT from the switch 400 at predetermined intervals (Step S10).

The controller 500 determines, on the basis of the statistical information STAT and the contents of the offloading policy table 540, whether or not setting modification of the NIC-offloading is necessary (Step S20). When setting modification is necessary (Step S20; Yes), the controller 500 enables/disenables the application of the NIC-offloading to desired flows by rewriting the filter tables FILT of the network adapter 100.

Also, the controller 500 determines, on the basis of the statistical information STAT and the contents of the offloading policy table 540, whether or not modification of the setting of the switch offloading is necessary (Step S40). When modification of the setting is necessary (Step S40; Yes), the controller 500 enables/disenables the application of the tunneling process to desired flows by rewriting the flow table 440 of the switch 400.

It should be noted that the procedure shown in FIG. 17 may be achieved by executing a flow control program by the controller 500. The flow control program is a computer program executed by the controller 500. The flow control program may be recorded in a non-transitory computer-readable recording medium.

The enabling/disenabling of the NIC-offloading may be performed by the virtual switch 200, instead of being directly done by the controller 500. In detail, out of the information stored in the offloading policy table 540 contained in the controller 500, information related to a flow to be handled by the virtual switch 200 is transmitted to the virtual switch 200.

The virtual switch 200 includes a route switcher 60 which controls the enabling/disenabling of the NIC-offloading. The route switcher 60 determines the enabling/disenabling of the NIC-offload based on the above-described information, referring to statistic information measured by the virtual switch 200 itself. This approach allows the virtual switch 200 to perform autonomous control of the NIC-offloading in accordance with the offloading policy, and eliminates the need for the controller 500 to control the offloading for the entire system. This effectively reduces the load imposed on the controller 500, and allows switching the enabling/disenabling of the offloading with a high accuracy in the time domain.

2-6. Advantageous Effects

As thus described, the function insufficiency of the filter tables FILT of the network adapter 100 is compensated by using the flow table 440 of a switch 400 depending on the necessity. This enables sufficiently performing the offloading, and sufficiently suppressing the concentration of the traffic on the virtual switch 200.

Also, "looping back" can be implemented by appropriately setting the flow table 440 of the switch 400. Here, the "looping back" means forwarding a packet received from a virtual machine 300 in a certain server 10 to another virtual machine 300 in the same server 10. Such looping back enables high-speed communications among virtual machines 300; however, a commercially-available network adapter 100 may not support the looping back function. Even in such a case, the looping back is achieved by using the flow table 440 of the switch 400 (ToR switch) in the present embodiment.

Although embodiments of the present invention are described with reference to attached drawings in the above, the present invention shall not be interpreted as being limited to the above-described embodiments; embodiments of the present invention may be modified by the person skilled in the art without departing from the scope of the present invention.

The invention claimed is:

1. A network system, comprising:
a server;
a switch connected to said server; and
a controller which controls functions of said server and said switch,
wherein said server includes:
a processor; and
a network adapter connected to said processor and adapted to handle packets for each flow in accordance with a filter table,
wherein said processor includes:
a virtual machine; and
a virtual switch which relays packets transmitted and received by the virtual machine to and from an external entity,
wherein said network adapter has an offloading function which exchanges packets with the virtual machine without using the virtual switch,
wherein, in a tunneling process, said switch exchanges packets with said virtual machine through a tunneling-dedicated port and without passing through said virtual switch, and said network adapter forwards the packets between said switch and the virtual machine without referring to the filter table, and
wherein said controller dynamically controls enabling/disenabling of said tunneling process for each flow.

2. The network system according to claim 1, wherein said switch processes packets for each flow in accordance with a flow table, and
wherein said controller dynamically controls enabling/disenabling of said tunneling process for each flow by setting said flow table so that a packet of a desired flow is inputted to or outputted from said tunneling-dedicated port.

3. The network system according to claim 1, wherein said controller further dynamically controls enabling/disenabling of said offloading function by said network adapter for each flow by setting a flow table.

4. The network system according to claim 1, wherein said network adapter performs packet transfer based on a MAC address.

5. The network system according to claim 1, wherein said controller determines enabling/disenabling of said offloading function and said tunneling process for each flow in accordance with policies defined in an offloading policy table.

6. The network system according to claim 5, wherein said switch transmits statistical information indicating communication status for each flow to said controller, and
wherein said controller determines enabling/disenabling of said offloading function and said tunneling process for each flow based on said statistical information and said policies.

7. The network system according to claim 1, wherein said switch comprises an OpenFlow switch, and
wherein said controller comprises an OpenFlow controller.

8. A controller for controlling functions of a server and a switch connected to said server in a network system, wherein said server includes:
a processor; and
a network adapter which processes packets of each flow in accordance with a filter table,
wherein said processor includes:
a virtual machine; and
a virtual switch which relays packets transmitted and received by said virtual machine to and from an external entity,
wherein said network adapter has an offloading function which exchanges packets with said virtual machine without using said virtual switch, and
wherein, in a tunneling process, said switch exchanges packets with said virtual machine through a tunneling-dedicated port and without passing through said virtual switch, and said network adapter forwards the packets between said switch and said virtual machine without referring to said filter table,
said controller comprising:
a flow controller; and
a storage device storing an offloading policy table,
wherein said offloading policy table defines policies of enabling/disenabling of said offloading function by said network adapter and enabling/disenabling of said tunneling process, and
wherein, in accordance with said offloading policy table, said flow controller dynamically controls the enabling/disenabling of said offloading function by said network adapter for each flow and dynamically controls the enabling/disenabling of said tunneling process for each flow.

9. A flow control method in a network system, wherein said network system includes:
a server; and
a switch connected to said server,
wherein said server includes:
a processor; and
a network adapter connected to said processor and processing packets for each flow in accordance with a filter table,
wherein said processor includes:
a virtual machine; and
a virtual switch which relays packets transmitted and received by said virtual machine to and from an external entity,
wherein said network adapter has an offloading function which exchanges packets with said virtual machine without using said virtual switch, and
wherein, in a tunneling process, said switch exchanges packets with said virtual machine through a tunneling-dedicated port and without passing through said virtual switch, and said network adapter forwards the packets between said switch and said virtual machine without referring to said filter table,
said flow control method comprising:
dynamically controlling enabling/disenabling of said offloading function by said network adapter for each flow; and
dynamically controlling enabling/disenabling of said tunneling process for each flow.

10. The network system according to claim 1, wherein the network adapter retrieves MAC addresses of MAC headers of the packets and determines transmission destinations of the packets by referring to a MAC table.

11. The network system according to claim 10, wherein said network adapter performs a packet transfer based on the MAC addresses of packets in the tunneling process without identifying flows in the tunneling process.

12. The network system according to claim 1, wherein the tunneling process performs a packet transfer between said virtual machine and said switch without referring to said filter table.

13. The network system according to claim 1, wherein, in said tunneling process, a flow table of said switch is used for a flow control.

14. The controller according to claim 8, wherein said network adapter retrieves MAC addresses of MAC headers of the packets and determines transmission destinations of the packets by referring to a MAC table.

15. The controller according to claim 14, wherein the network adapter performs a packet transfer based on the MAC addresses of packets in the tunneling process without identifying flows in the tunneling process.

16. The controller according to claim 8, wherein the tunneling process performs a packet transfer between said virtual machine and said switch without referring to said filter table.

17. The controller according to claim 8, wherein, in said tunneling process, a flow table of said switch is used for a flow control.

18. The flow control method according to claim 9, wherein said network adapter retrieves MAC addresses of MAC headers of the packets and determines transmission destinations of the packets by referring to a MAC table.

19. The flow control method according to claim 9, wherein said tunneling process performs a packet transfer between said virtual machine and said switch without referring to said filter table.

20. The flow control method according to claim 9, wherein, in said tunneling process, a flow table of said switch is used for a flow control.

* * * * *